(12) United States Patent
Kakuya et al.

(10) Patent No.: US 8,358,989 B2
(45) Date of Patent: Jan. 22, 2013

(54) WIRELESS COMMUNICATION APPARATUS HAVING AUTOMATIC ANTENNA TUNING FUNCTION

(75) Inventors: Yuuji Kakuya, Okazaki (JP); Akira Takaoka, Okazaki (JP); Munenori Matsumoto, Kariya (JP); Tomotsugu Sekine, Kariya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 140 days.

(21) Appl. No.: 13/066,411

(22) Filed: Apr. 14, 2011

(65) Prior Publication Data

US 2011/0256841 A1  Oct. 20, 2011

(30) Foreign Application Priority Data

Apr. 16, 2010  (JP) ................................. 2010-094868

(51) Int. Cl.
*H04B 1/18* (2006.01)

(52) U.S. Cl. ...................... 455/193.1; 455/269; 455/280

(58) Field of Classification Search ............... 455/193.1, 455/226.1, 230, 254, 269, 280, 283, 291, 455/290

See application file for complete search history.

(56) References Cited

U.S. PATENT DOCUMENTS

2007/0251309 A1  11/2007  Katou

FOREIGN PATENT DOCUMENTS

| JP | 11-098039 | 4/1999 |
| JP | 2007-290664 | 11/2007 |

*Primary Examiner* — Christian Hannon
(74) *Attorney, Agent, or Firm* — Harness, Dickey & Pierce, P.L.C.

(57) ABSTRACT

A matching circuit, connected to a receiving antenna and to the input of a receiving circuit, incorporates a variable capacitor that is adjustable for tuning the resonance frequency of the antenna to a desired reception frequency. In an automatic tuning mode of operation, an oscillator signal of different frequency from the reception frequency is applied to induce resonance of the antenna and matching circuit, and the variable capacitor is adjusted until an output signal level from the receiving circuit attains a predetermined value which has been stored beforehand in a memory and which corresponds to a condition whereby the antenna resonance frequency corresponds to the reception frequency and impedance matching exists between the antenna and receiving circuit.

14 Claims, 7 Drawing Sheets

WIRELESS COMMUNICATION APPARATUS HAVING AUTOMATIC ANTENNA TUNING FUNCTION

CROSS-REFERENCE TO RELATED APPLICATIONS

This application is based on and incorporates herein by reference Japanese Patent Application No. 2010-94868 filed on 16 Apr., 2010.

BACKGROUND OF THE INVENTION

1. Field of Application

The present invention relates to a wireless communication apparatus in which the impedance of a receiving antenna is matched to the input impedance of a receiving circuit by an adjustable matching circuit.

2. Description of Related Art

A type of wireless communication apparatus is known, for example as described in Japanese patent publication No. 2007-290664 (designated in the following as reference document 1), having a receiving antenna and an antenna resonance circuit formed of inductors and a set of capacitors, with the capacitors controlled to function as a variable capacitor and the inductors serving to couple the antenna resonance circuit to the antenna. The antenna resonance circuit exhibits peak resonance at a specific frequency, so that a maximum level of signal power of a received signal is transferred from the antenna to a voltage detection circuit when the frequency of the received signal is equal to the resonance frequency of the antenna resonance circuit. Here "frequency of the received signal" signifies the carrier frequency of a modulated transmitted wireless signal. A capacitance adjustment circuit can adjust the capacitance in the antenna resonance circuit, to thereby adjust the resonance frequency. The apparatus also includes an oscillator for generating an adjustable-frequency test signal. The apparatus can be set in a tuning mode in which the test signal is applied to the antenna resonance circuit, with the test signal frequency being successively varied to detect the resonance frequency of the antenna resonance circuit, i.e., frequency at which peak output amplitude is obtained, and with the capacitance being adjusted to set that resonance frequency at a required reference value, that is, at a desired reception frequency. The adjustment is performed automatically by a control circuit, based on detected signal strength values that are obtained by the voltage detection circuit.

In the case of a wireless communication apparatus for high-frequency wireless operation, the resonance frequency of a receiving antenna itself (i.e., determined by the distributed inductance and capacitance parameters of the antenna) may be tuned to correspond to a desired reception signal frequency. Generally, a matching circuit is connected to the antenna and to the input of a receiving circuit, and serves to match the impedance of the antenna to the input impedance of the receiving circuit, and may also be adjustable for modifying the resonance frequency of the antenna. Ideally, the antenna resonance frequency (as modified by reactance values of the matching circuit) should correspond to a desired reception signal frequency, with the source impedance presented to the receiving circuit by the matching circuit corresponding to the input impedance of the receiving circuit, at that frequency.

However if any metallic objects are brought close to the antenna after the antenna resonance frequency has been set appropriately, the impedance of the antenna at that frequency will be altered. As a result, the antenna resonance frequency will be shifted from the desired value, and the impedance relationship between the antenna and the matching circuit will be altered. Reception sensitivity at the desired reception frequency will thereby be lowered. Hence, an automatic tuning function, for maintaining the antenna resonance frequency close to a specific reception frequency and maintaining impedance matching between the antenna and receiving circuit would be desirable.

It might be envisaged that the automatic tuning method of reference document 1 could be adapted for this purpose. However, that would have the disadvantage of requiring a variable-frequency oscillator for producing a test signal, and controlling the oscillator to generate successively different test signal frequencies when a tuning operation is being performed. Thus it would be necessary to provide such a variable-frequency oscillator as an additional component of a wireless communication apparatus, causing the circuit scale to be increased.

Furthermore, it might be envisaged that the automatic tuning function of reference document 1 could be simplified by using a fixed-frequency oscillator to produce a test signal at the desired reception frequency. A variable capacitor in the matching circuit could be successively varied, while the test signal is being applied to the matching circuit, until a peak value is reached by the output signal from the receiving circuit (voltage detection circuit). However when such an adjustment operation is commenced, there would be ambiguity as to whether the capacitance should be increased or decreased, to bring the matching circuit towards the optimum condition. Thus it might be necessary to successively adjust the capacitor over its entire range of variation, until a peak value of output signal from the receiving circuit is detected.

SUMMARY OF THE INVENTION

It is an objective of the present invention to overcome the above problems, by providing a wireless communication apparatus whereby the impedance of a receiving antenna at a specific reception frequency can be held matched to the input impedance of a receiving circuit, irrespective of factors such as changes in position of metallic objects near the antenna, without requiring use of a variable-frequency oscillator for generating a test signal, and whereby an automatic tuning operation to perform impedance matching can be rapidly performed, without ambiguity as to a direction in which a tuning adjustment must be performed.

In particular, it is an objective to provide such a wireless communication apparatus, whereby the circuit scale will not be increased by incorporation of the automatic tuning function when a receiving circuit of the wireless communication apparatus is of superheterodyne type. Such a receiving circuit inherently incorporates an oscillator circuit (local oscillator) for performing frequency conversion of a received signal.

To achieve the above objective, the invention provides a wireless communication apparatus which includes an antenna and a receiving circuit which receives a reception signal from the antenna, with the reception signal having a predetermined frequency (i.e., carrier frequency), and a voltage detection circuit which receives an output signal from the receiving circuit, and generates a detection voltage in accordance with the value of signal power received by the receiving circuit. The apparatus also includes a matching circuit connected to the antenna and to an input terminal of the receiving circuit, which is adjustable for establishing an impedance matched condition whereby the antenna impedance (at the reception signal frequency) matches the input is impedance of the receiving circuit, while the resonance frequency of the antenna corresponds to the reception signal frequency. The apparatus further includes an oscillator circuit, and switch means coupled to each of the oscillator circuit, the receiving circuit and the matching circuit. A control circuit controls the switch means to establish either a tuning mode of operation, in which the oscillator signal is applied to the antenna (i.e., to the connected combination of the antenna and matching circuit) or a reception mode, in which the oscillator signal is isolated from the antenna. The control circuit also performs control of the matching circuit during operation in the tuning mode, by adjusting the capacitance value of a variable capacitor of the matching circuit in accordance with the detection voltage.

The wireless communication apparatus of the invention is characterized in that the frequency of the oscillator signal differs from the reception signal frequency by a fixed amount, and in that the apparatus comprises a memory which stores a reference voltage value. The reference voltage value is a detection voltage value which has been derived beforehand, during operation in the tuning mode, under the condition that the impedance matched condition has been established (with the antenna resonance frequency corresponding to the reception frequency).

The apparatus is further characterized in that the control circuit comprises tuning circuit means which operate when the tuning mode is entered at any time after the reference voltage value has been derived and stored. The tuning circuit means comprise initial value determining means and capacitance adjustment means. The initial value determining means serve to compare the detection voltage with the reference voltage value and to determine an initial adjustment value of capacitance, based on a result of the comparison. The capacitance adjustment means serve to successively adjust the capacitance value of the variable capacitor of the matching circuit, while successively comparing the detection voltage with the reference voltage value, with the adjustment commencing from the aforementioned initial adjustment value. The successive adjustment is halted when the detection voltage matches the reference voltage value.

During operation in the tuning mode, the oscillator signal excites resonance of the antenna, so that a resultant signal is inputted to the receiving circuit, having an amplitude determined by the direction and amount of difference between the antenna resonance frequency and the oscillator signal frequency. Thus, if the impedance of the antenna at the reception frequency has become changed (e.g., due to the distributed inductance value of the antenna having become changed due to positioning a metallic object near the antenna) from that of the impedance matched condition, the detection voltage will be either decreased or increased relative to the reference voltage value, in accordance with the amount and direction of deviation of the antenna resonance frequency from the reception signal frequency. Thus, it can be determined whether the capacitance value of the variable capacitor requires to be increased or to be decreased, for thereby decreasing or increasing the resonance frequency of the antenna. An appropriate initial adjustment value can thereby be determined. The required amount of capacitance adjustment can thereby be reduced, and the time required to restore the impedance matched condition (i.e., condition at which the detection voltage matches the reference voltage value, in the tuning mode) can be made short.

For example, the initial value determining means may be configured to select the initial adjustment value as either the maximum value or the minimum value of the variation range of the variable capacitor, in accordance with the result of comparing the detection voltage with the reference voltage value.

Such a wireless communication apparatus may further comprise a current limiting resistor coupled to the switch means. The impedance of the current limiting resistor (i.e., at the oscillator signal frequency) is predetermined to be substantially higher than the input impedance of the receiving circuit. In that case, the control circuit controls the switch means to connect the current limiting resistor between the matching circuit and the input terminal of the receiving circuit during operation in the tuning mode, and to connect the matching circuit to the input terminal of the receiving circuit (with the current limiting resistor disconnected) during operation in the reception mode.

By incorporating such a resistor when the input impedance of the receiving circuit is low, it can be ensured that the resonance characteristics of the antenna (in the tuning mode) will not be adversely affected by the input impedance of the receiving circuit, i.e., by an excessive level of current flowing between the antenna and the receiving circuit.

The invention can be most advantageously applied to a wireless communication apparatus in which the receiving circuit is of superheterodyne type, and so inherently incorporates an oscillator circuit (local oscillator) having a frequency that differs from a required reception frequency by a fixed amount. It thereby becomes unnecessary to add an oscillator circuit for the purpose of operation in the tuning mode, so that the circuit scale of the apparatus is not increased by providing the automatic tuning function.

From another aspect, such a wireless communication apparatus preferably further comprises a reference capacitance value held stored in the aforementioned memory, with the reference capacitance value being a value of the variable capacitor that has been derived beforehand during operation in the tuning mode, under the condition of impedance matching between the antenna and the receiving circuit (with the antenna resonance frequency equal to the required reception frequency).

In that case, the initial value determining means can be configured to select the initial adjustment value as a value within one of two capacitance variation ranges, i.e., a first range extending between the reference capacitance value and a maximum limit of capacitance variation and a second range which extends between the reference capacitance value and a minimum limit of capacitance variation, with the selected capacitance variation range being determined in accordance with whether the detection voltage value is higher than or lower than the reference voltage value. It can thereby be ensured that the maximum amount of capacitance adjustment that will be performed in a tuning operation (i.e., capacitance sweep width) will be substantially less than the entire possible range of adjustment of the variable capacitor.

Furthermore in that case, the initial value determining means may for example be configured to select the initial adjustment value as either the minimum value of the first range or the maximum value of the second range, in accordance with the result of the aforementioned voltage comparison. With such a configuration, adjustment would be performed by successive capacitance increments when the first range is selected, and by successive capacitance decrements when the second range is selected.

The resonance frequency of the antenna is preferably set to the required reception frequency value under a condition in which no metallic objects are near the antenna. Similarly, the reference voltage value and reference capacitance value are preferably derived under a condition in which no metallic objects are near the antenna.

DESCRIPTION OF PREFERRED EMBODIMENTS

Figure 1:
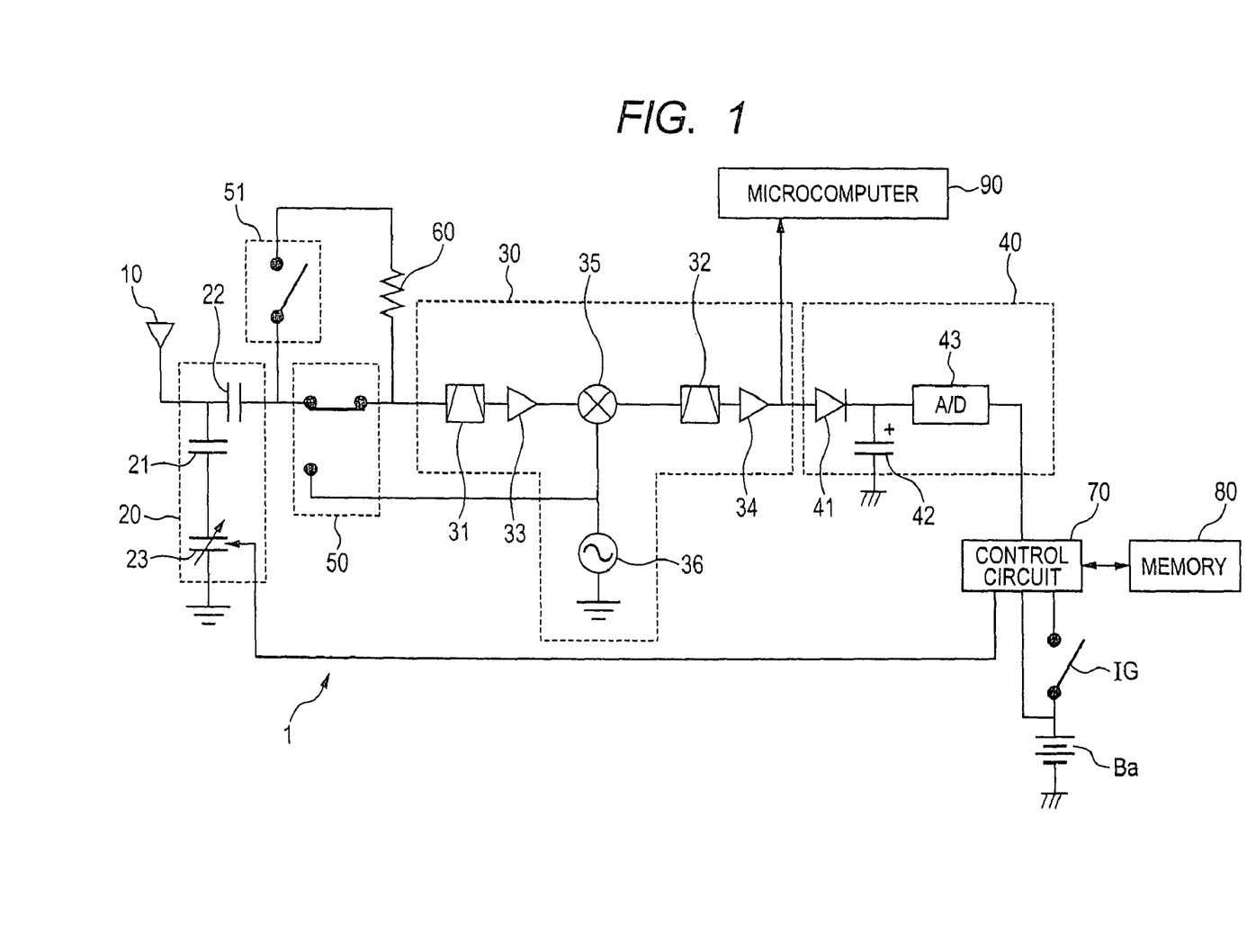
FIG. 1 is a diagram showing the overall circuit configuration of an embodiment of a wireless communication apparatus, set in a reception mode of operation.
Figure 2:
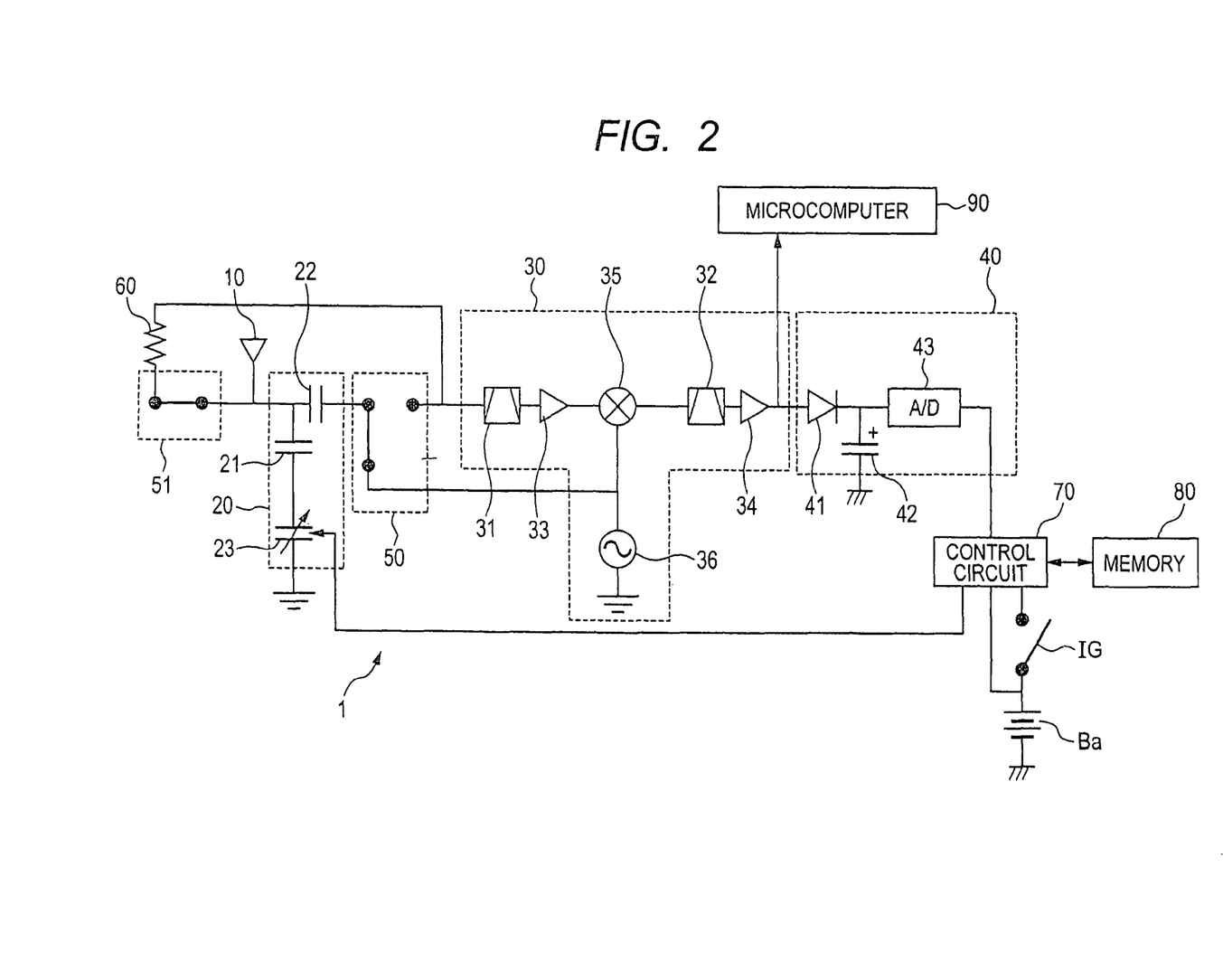
FIG. 2 is a diagram corresponding to FIG. 1, showing the embodiment when set in a tuning mode of operation.

An embodiment of a wireless communication apparatus, intended for installation in a motor vehicle, will be described referring first to the circuit block diagrams of FIGS. 1 and 2. FIG. 1 shows the wireless communication apparatus (designated by numeral 1) when set in a reception mode of operation, while FIG. 2 shows the apparatus when set in a tuning mode of operation, described hereinafter. Numeral 10 denotes an antenna, which is connected via a matching circuit 20 to an input of a receiving circuit 30. The wireless communication apparatus 1 is part of a "smart entry" system of a motor vehicle, utilized for keyless entry to the vehicle, i.e., enabling operations such as locking/unlocking of a vehicle door, starting of the vehicle engine, etc. The wireless communication apparatus 1 and antenna 10 may be installed within various different types of motor vehicle, for example beside a C-pillar (one of the side window pillars) of a vehicle, for example.

As shown, in addition to the matching circuit 20 and receiving circuit 30 the wireless communication apparatus 1 also includes a voltage detection circuit 40, switches 50 and 51, a resistor (current limiting resistor) 60, a control circuit 70, a memory 80 and a microcomputer 90. The matching circuit 20 is formed of a capacitor 22 which is connected between the antenna 10 and an input of the receiving circuit 30 via the switch 50, and a capacitor 21 and a variable capacitor 23 which are connected in series between the antenna 10 and ground potential. The variable capacitor 23 of this embodiment is a voltage-controlled element, however the invention is not limited to use of a specific form of variable capacitor.

The receiving circuit 30 is a superheterodyne type of circuit, in which a received signal supplied from the matching circuit 20 is mixed with a local oscillator signal whose frequency differs from the reception signal frequency by a specific amount. The term "reception signal frequency", as used in this description and in the appended claims, signifies the carrier frequency of a transmitted modulated-carrier wireless signal that is required to be received by the wireless communication apparatus 1 from the antenna 10. Such a required signal is referred to in the following as the reception signal.

The receiving circuit 30 includes bandpass filters 31 and 32, voltage amplifiers 33 and 34, a mixer 35, and a local oscillator 36. The filter circuit 31 passes a range of frequencies including the reception signal frequency, and the output signal from the filter circuit 31 is amplified by the voltage amplifier circuit 33. The mixer 35 multiplies the output signal from the voltage amplifier circuit 33 by the local oscillator signal from the local oscillator 36, to convert the reception signal to a lower frequency. With this embodiment, the local oscillator frequency is set higher than the reception signal frequency by a fixed amount. The filter circuit 32 passes frequency components of the output signal from the mixer 35 that are within a predetermined frequency band, and the voltage amplifier circuit 34 amplifies the voltage of the output signal from the filter circuit 32.

The voltage detection circuit 40 converts the output signal from the voltage amplifier circuit 34 of the receiving circuit 30 to a digital signal. The voltage detection circuit 40 is formed of a diode 41, a capacitor 42, and an A/D (analog-to-digital) converter 43. The anode of the diode 41 is connected to the output of the voltage amplifier circuit 34 of the receiving circuit 30, while the cathode is connected to the A/D converter circuit 43. The diode 41 thereby performs half-wave rectification of the output signal from the voltage amplifier circuit 34. The capacitor 42 has a positive terminal connected to the cathode of the diode 41 and a negative terminal connected to ground potential, and serves to smooth the output voltage from the diode 41. The voltage appearing between the positive and negative terminals of the capacitor 42 is determined by the level of signal power received by the receiving circuit 30, and is converted to a digital signal by the A/D converter circuit 43. The digital signal produced from the A/D converter circuit 43 is a RSSI (Received Signal Strength Indication) voltage signal, which expresses the power of a signal that is being received by the receiving circuit 30 from the antenna 10.

A first terminal of the capacitor 22 of the matching circuit 20 is connected to the antenna 10, while the second (opposite) terminal of capacitor 22 can be connected to the receiving circuit 30, as shown in FIG. 1. That second terminal of capacitor 22 will be designated as the output terminal of the matching circuit 20 in the following. A first terminal of the filter circuit 31 can be connected to the output terminal of the matching circuit 20, as shown in FIG. 1, and will be designated as the input terminal of the receiving circuit 30 in the following. The second (opposing) terminal of the filter circuit 21 is connected to the input side of the voltage amplifier 33.

The switch 50 is controlled by the control circuit 70 to connect the output terminal of the matching circuit 20 either to the input terminal of the receiving circuit 30 (in the reception mode shown in FIG. 1) or to the local oscillator 36 (in the tuning mode shown in FIG. 2). The switch 51 is controlled by the control circuit 70 to connect the resistor 60 between the antenna 10 and the input terminal of the receiving circuit 20 (in the tuning mode) or to disconnect the resistor 60 from the input terminal of the receiving circuit 20 (in the reception mode).

The control circuit 70 is powered by a battery Ba and is activated to operate based on the digital signal from the A/D converter circuit 43 when an ignition switch IG is set on. The control circuit 70 is based on a microcomputer which operates in accordance with a program that has been stored beforehand in the memory 80. The memory 80 also has stored therein beforehand a reference capacitance value C0 and a reference voltage value V0, described hereinafter.

The microcomputer 90 functions as a signal processing apparatus, which performs various signal processing including discrimination of vehicle recognition codes, etc., based on the output signal from the receiving circuit 30.

The operation of the wireless communication apparatus 1 is described in the following, first for the case of operation in the reception mode (shown in FIG. 1). When the matching circuit 20 has been set to establish impedance matching between the antenna 10 and the receiving circuit 30 for a specific reception frequency (with the resonance frequency of the antenna 10 being close to that reception frequency), optimum reception sensitivity is obtained.

In that condition, if the positions of metallic objects near the antenna 10 become changed, the distributed parameters (inductance, capacitance, resistance) of the antenna 10 will thereby be altered. The impedance of the antenna 10 at the reception frequency will thereby become altered, and with this embodiment, the capacitors 21 and 22 of the matching circuit 20 are constituted as distributed parameters of circuit components, and so their values may also become altered. As a result, the condition of impedance matching between the antenna 10 and the receiving circuit 30 at the reception frequency will not be maintained and the antenna resonance frequency will be altered, so that the reception sensitivity will be lowered.

For example, the configuration of the body and frame of a vehicle in which the wireless communication apparatus is installed will vary depending upon the particular vehicle type, and the positions of metallic objects which are close to the antenna 10 will vary accordingly. The embodiment is configured to enable optimum performance of the receiving circuit, irrespective of the type of vehicle in which the apparatus is installed. Specifically, after the antenna 10, matching circuit 20 and receiving circuit 30 have been installed in a vehicle, the wireless communication apparatus 1 is set in the tuning mode each time the vehicle ignition switch is set on, to thereby restore impedance matching between the antenna 10 and the receiving circuit 30.

The wireless communication apparatus 1 is set in the tuning mode by setting the switches 50 and 51 to the respective conditions shown in FIG. 2 (by control signals applied by the control circuit 70, which are not shown in the drawings). In that case, the oscillator signal from the local oscillator 36 is applied via the switch 50 to the output terminal of the matching circuit 20, which becomes disconnected from the input terminal of the receiving circuit 30, while the resistor 60 becomes connected via the switch 51 between the antenna 10 and the input terminal of the receiving circuit 30 (i.e., the input terminal of the filter circuit 31).

Figure 3:
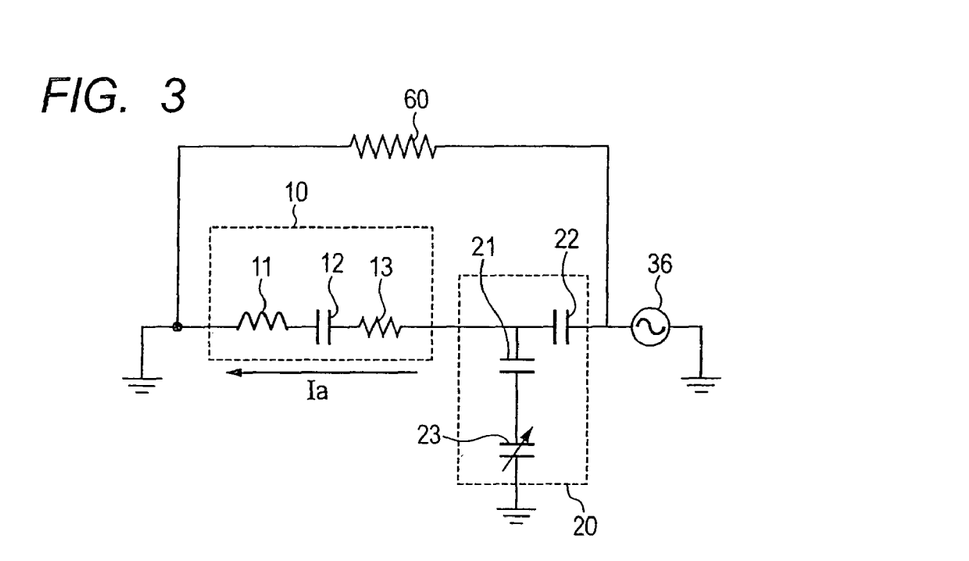
FIG. 3 is a circuit diagram showing a resonance circuit constituted by an antenna and a matching circuit, connected to a local oscillator, in the tuning mode of the embodiment.

FIG. 3 is an equivalent circuit diagram illustrating the condition shown in FIG. 2. As shown, the antenna 10 can be represented as an inductor 11, a capacitor 12 and a resistor 13, connected in series, with one end of the series being connected to ground potential and the other end being connected via the matching circuit 20 to the local oscillator 36. Thus the antenna 10 and matching circuit 20 form a resonant circuit which is driven by the signal from the local oscillator 36.

As shown in FIG. 3, since the impedance of the resistor 60 is substantially higher than the input impedance of the receiving circuit 30 (i.e., total impedance of the series-connected filter circuit 31, voltage amplifier circuit 33 and mixer 35), the resistor 60 can be considered to be connected between ground potential and the local oscillator 36. Hence the filter circuit 31, voltage amplifier circuit 33 and mixer 35 are omitted from the equivalent circuit of FIG. 3. By thus connecting the resistor 60, it can be ensured that the amount of current which flows between the antenna 10 and the filter circuit 31 during operation in the tuning mode will be sufficiently small, so that the resonance characteristics of the resonant circuit formed by the antenna 10 and matching circuit 20 will not be is adversely affected. The term "antenna resonance frequency" as used herein signifies a resonance frequency determined by the inductance and capacitance values of the antenna 10 and the capacitance value of the matching circuit 20 (specifically, the effective capacitance of the series-connected capacitor 21 and variable capacitor 23).

Figure 4:
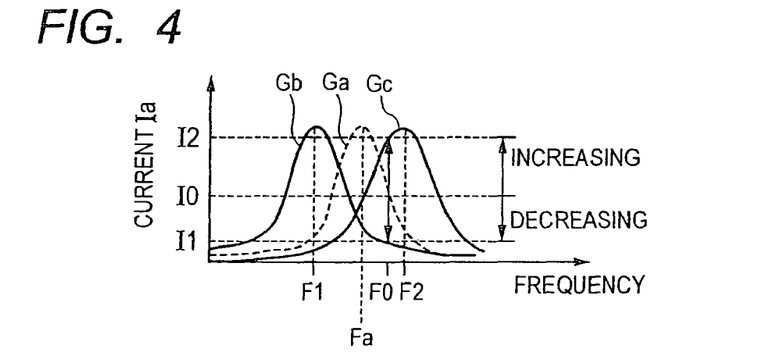
FIG. 4 shows graphs illustrating relationships between antenna current and antenna resonance frequency values, with the embodiment.

FIG. 4 shows graphs for describing the relationship between frequency and the level of current Ia (indicated in FIG. 3) which flows in the antenna 10 during operation in the tuning mode, at three different values of antenna resonance frequency. As shown in FIG. 4, when the antenna resonance frequency is Fa (the desired reception signal frequency), the antenna resonance characteristic is Ga. The characteristic Gb corresponds to the case in which the antenna resonance frequency is lower than Fa (with a resonance peak at frequency F1), and the characteristic Gc corresponds to the case in which the antenna resonance frequency is higher than Fa (with a resonance peak at frequency F2).

Designating the frequency of the oscillator signal from the local oscillator 36 as F0, during operation in the tuning mode, the antenna 10 will resonate in response to the oscillator signal, as described referring to FIG. 3. The value of current Ia which flows in the antenna 10 in that condition, when the resonance frequency of the antenna 10 is Fa, is designated as I0. Ia will vary in accordance with changes in the disposition of metallic objects which are close to the antenna 10 (i.e., changes which result in variation of the impedance of the antenna 10 with respect to the frequency F0). Assuming that the resonance frequency of the antenna 10 is lowered from Fa to F1 by an adjacent metal object, the antenna current Ia will be decreased from I0 to I1, as shown in FIG. 4. Thus the voltage amplitude Vr that is developed across the resistor 60 will fall accordingly, from Va to Vb as shown in FIG. 5.

Figure 5:
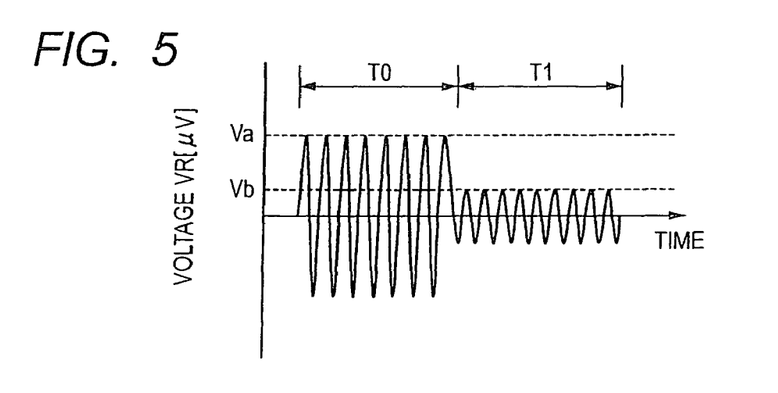
FIG. 5 is a timing diagram showing voltage variations between terminals of a resistor in the embodiment.

Specifically, during the interval T0 shown in FIG. 5, the antenna 10 has the desired resonance frequency Fa. During the succeeding interval T1, the resonance frequency of the antenna 10 has changed from Fa to F1, so that the voltage Vr will fall accordingly, e.g., from Va to Vb. The amplitude of the input signal supplied to the receiving circuit 30 via the resistor 60 falls correspondingly. That input signal is passed through the filter circuit 31 and voltage-amplified by the amplifier 33, with the resultant amplified signal being converted to a lower frequency by the mixer 35. The filter circuit 32, voltage amplifier circuit 34, diode 41 and A/D converter circuit 43 operate on the signal as described hereinabove, with a resultant RSSI voltage value being thereby produced from the A/D converter circuit 43 and supplied to the control circuit 70.

Figure 6:
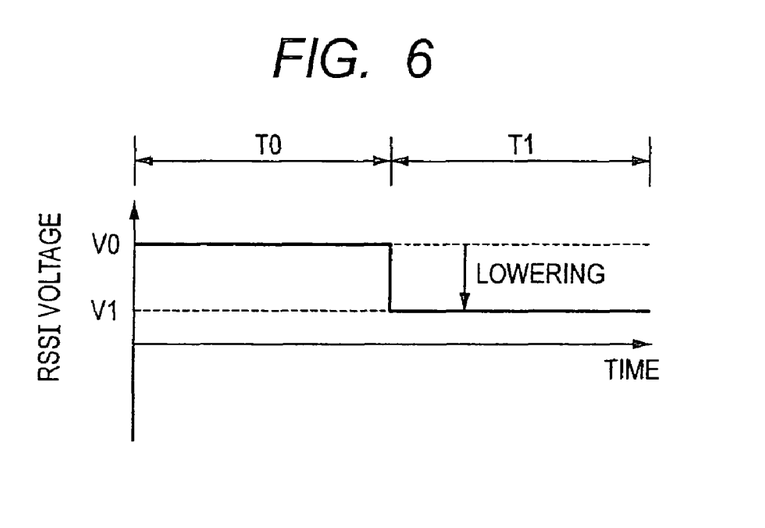
FIG. 6 is a timing diagram corresponding to FIG. 5, illustrating variations in a RSSI voltage.

Thus as shown in FIG. 6, designating the RSSI value obtained during the interval T0 of FIG. 5 as V0, this falls to V1 in the interval T1.

Referring again to FIG. 4, when the positions of metallic objects near the antenna 10 becomes changed, the resonance frequency of the antenna 10 may thereby become increased from the required value Fa to become F2. In that case, during operation in the tuning mode, the antenna current Ia will be increased, e.g., from I0 to I2. Hence the level of input signal applied from the resistor 60 to the receiving circuit 30, and the RSSI voltage from the A/D converter circuit 43, will increase accordingly.

It can thus be understood that if the resonance frequency of the antenna 10 has become changed from the desired value Fa, then during operation in the tuning mode, the RSSI voltage value will differ accordingly from a reference voltage value, i.e., will differ from a RSSI voltage value that has been previously obtained in the tuning mode when the resonance frequency of the antenna 10 is Fa.

Prior to installing the wireless communication apparatus in a vehicle, preferably with no metallic objects near the antenna 10, the variable capacitor 23 is adjusted to establish the impedance matched condition as defined above, i.e., in which the antenna resonance frequency corresponds to the desired reception frequency, with the antenna impedance matched to the input impedance of the receiving circuit 30. This can be done by setting the switches 50 and 51 to the reception mode, and adjusting the variable capacitor 23 to obtain a peak value of RSSI voltage from the A/D converter circuit 43, while a transmitted wireless signal at the reception frequency is being received by the antenna 10. The value thereby set for the variable capacitor 23 is then stored in the memory 80 as a reference capacitance value.

The wireless communication apparatus 1 is then set in the tuning mode, with no metallic objects near the antenna 10. The value of RSSI voltage obtained from the A/D converter circuit 43 in that condition, designated as V0, is then stored in the memory 80 as a reference voltage value.

Subsequently, e.g., after the wireless communication apparatus has been installed in a vehicle and the ignition switch IG is set on, the control circuit 70 controls the switches 50 and 51 to establish the tuning mode. The control circuit 70 then successively varies the capacitance value of the variable capacitor 23 (starting from a specific initial value, selected as described hereinafter), while successively judging whether the RSSI voltage value from the ND converter circuit 43 coincides with the reference voltage value V0. When that coincidence condition is detected, this indicates that the impedance matched condition has been restored, with the resonance frequency of the antenna 10 corresponding to the desired value Fa. The switches 50 and 51 are then controlled to return to the reception mode.

The control processing executed by the control circuit 70 in the tuning mode, after the reference capacitance and voltage values C0 and V0 have been obtained and stored (e.g., after the wireless communication apparatus 1 has been installed in a vehicle) will be described more specifically in the following, referring first to the flow diagram of FIG. 7. This processing is performed by executing the aforementioned computer program, each time the ignition switch IG of the vehicle is set on.

Firstly in step S100, the switches 50 and 51 are controlled to establish the tuning mode. Resonance of the antenna 10 is thereby induced by the oscillator signal applied to the output terminal of the matching circuit 20 from the local oscillator 36. An input signal voltage is thereby applied to the receiving circuit 30 via the resistor 60, having an amplitude in accordance with the magnitude of induced resonance of the antenna 10. A resultant RSSI digital voltage value is thereby obtained from the A/D converter circuit 43, based on the output signal from the receiving circuit 30.

In this condition, the control circuit 70 successively varies the capacitance of the variable capacitor 23, while repetitively judging whether the RSSI voltage coincides with the value V0. Details of step S100 of FIG. 7 are shown in the flow diagram of FIG. 8.

Firstly in step S101 a decision is made as to whether the output value from the A/D converter circuit 43 is greater than V0. As can be understood from FIGS. 4 and 5 above, during operation in the tuning mode, when the resonance frequency of the antenna 10 is lower than the required value (Fa), the RSSI voltage is reduced from the reference value V0 accordingly, while if the resonance frequency is higher than the required value then the RSSI voltage becomes higher than V0.

Figure 9:
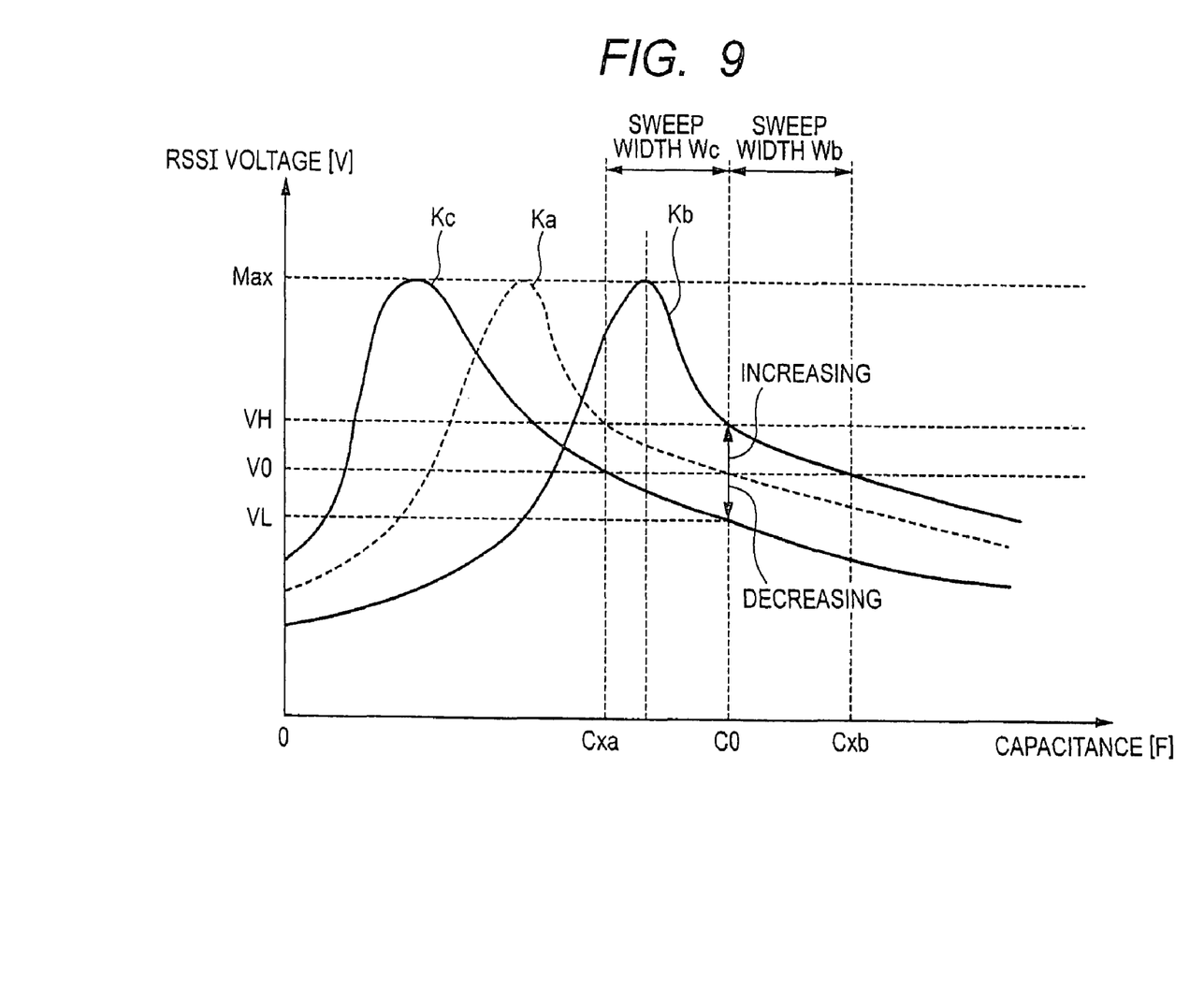
FIG. 9 shows graphs illustrating relationships between RSSI voltage and capacitance values of a variable capacitor, in the embodiment.

FIG. 9 shows graphs illustrating the relationship between variation of the capacitance of the variable capacitor 23 and the RSSI voltage during operation in the tuning mode. The characteristic Ka shows the case in which there is impedance matching between the antenna 10 and receiving circuit 30, with the resonance frequency of the antenna 10 corresponding to the desired reception frequency Fa. The characteristic Kb corresponds to a condition in which the resonance frequency of the antenna 10 is higher than Fa, and the characteristic Kc corresponds to a condition in which the resonance frequency of the antenna 10 is lower than Fa.

As can be understood from FIG. 9, when the capacitance of the variable capacitor 23 is the reference value C0 and the resonance frequency of the antenna 10 is Fa, the RSSI voltage becomes the reference value V0. However if the resonance frequency has become higher than Fa (e.g., due to presence of a metallic object near the antenna 10), the RSSI voltage will be increased from V0, e.g., to VH while, conversely, if the resonance frequency has become lower than Fa, the RSSI voltage will be decreased from V0, e.g., to VL.

Referring again to the equivalent circuit diagram of FIG. 3, ignoring the capacitors 21 and 22 for simplicity and considering only the variable capacitor 23, and assuming that the equivalent circuit of the antenna 10 consists of only the inductor 11, the following equation (1) is obtained, whereby the resonance frequency f of the antenna 10 is determined by the inductance value L of the inductor 11 and the capacitance C of the variable capacitor 23.

$$f=1/\{2\pi(L\times C)^{1/2}\} \quad (1)$$

As can be understood from equation (1), the higher the value of capacitance C, the lower becomes the resonance frequency f of the antenna 10. Hence, if the resonance frequency has deviated to become higher than the required reception frequency Fa, it is necessary to increase the capacitance of the variable capacitor 23 relative to C0, to an extent for bringing the resonance frequency of the antenna 10 to the value Fa.

Figure 8:
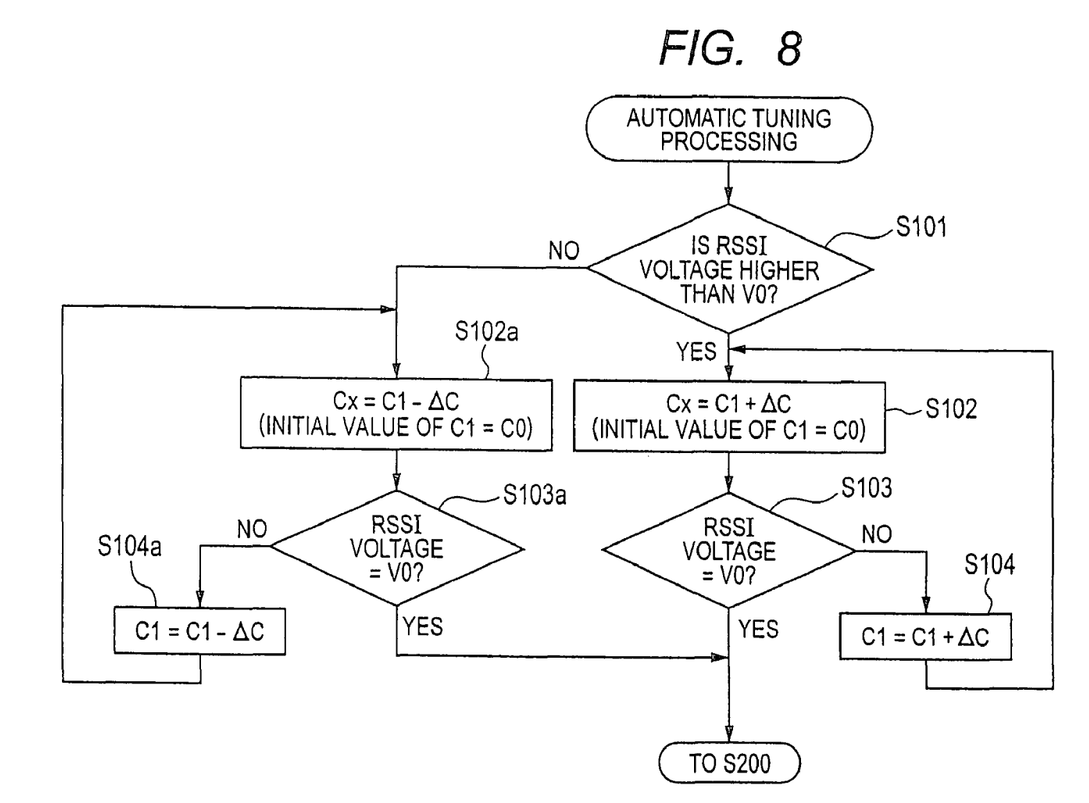
FIG. 8 is a flow diagram showing details of a part of the control processing of FIG. 7.

Thus if it is found in step S101 of FIG. 8 that the RSSI voltage is higher than the reference value V0 (indicating that the resonance frequency of the antenna 10 is higher than Fa), the capacitance of the variable capacitor 23 is first set to the reference value C0 as an initial value, and is thereafter successively incremented within a range which is higher than C0 (i.e., between C0 and a maximum value of the capacitance variation range), until the RSSI voltage becomes equal to V0. Specifically, when there is a YES decision in step S101, in the first execution of step S102, a value Cx is calculated as the sum of C0 and a fixed amount ΔC. The result Cx is then set as the capacitance of the variable capacitor 23 (step S102). This can be expressed as follows, where C1 is equal to C0 in the first execution of step S102.

$$Cx=C1\Delta C \quad (2)$$

Next in step S103, if it is judged that the RSSI voltage has become equal to V0 (YES decision), step S200 is then executed, to return to the reception mode. If the RSSI voltage differs from V0 (NO decision in step S103), indicating that the antenna resonance frequency remains higher than Fa, step S104 is then executed in which a new value of capacitance C1 is calculated by adding ΔC to the previously obtained value, and the processing of steps S102, S103 are repeated. The series of steps S102, S103, S104 are successively repeated until a YES decision is reached in step S103, indicating that the antenna resonance frequency matches the reception frequency Fa. For example if the antenna resonance condition corresponds to the characteristic Kb in FIG. 9 at the commencement of such an automatic tuning operation, a YES decision will be reached in step S103 when the capacitance of the variable capacitor 23 has become increased from C0 to Cxb.

If a NO decision is reached in step S101, indicating that the resonance frequency of the antenna 10 is lower than the required reception frequency, C0 is set as the initial value of C1, then the value Cx is calculated by subtracting the fixed amount ΔC from that value of C1 in step S102a, and Cx is then set as the capacitance value of the variable capacitor 23. Step S103a, which is identical to step S103, is then executed. If there is a YES decision in step S103a, S200 of FIG. 7 is then executed to return to the reception mode, while if there is a NO decision (indicating that the resonance frequency of the antenna 10 is lower than the reception frequency Fa), a new value of C1 is calculated by subtracting ΔC from the previously obtained value of C1, and steps S102a, S103a, S104a are successively executed until a YES decision is reached in step S103a.

For example if the antenna resonance frequency condition corresponds to the characteristic Kc in FIG. 9 at the commencement of such an automatic tuning operation, a YES decision will be reached in step S103a when the capacitance of the variable capacitor 23 has become decreased from C0 to Cxa.

The above can be summarized as follows. Prior to use of the wireless communication apparatus 1 (e.g., prior to installation in a vehicle) the capacitance of the variable capacitor 23 is first adjusted until the impedance matched condition is set, with the resonance frequency of the antenna 10 corresponding to the required reception frequency Fa, preferably under a condition in which no metal objects are near the antenna 10. The value C0 which been set for the variable capacitor 23 is stored in memory as a reference capacitance value. Subsequently (with the condition of the antenna 10 unchanged), the apparatus is set in the tuning mode, and the RSSI voltage V0 obtained in that condition is stored in memory as a reference voltage value V0.

In each subsequent automatic tuning operation (e.g., after the wireless communication apparatus 1 has been installed in a vehicle), the wireless communication apparatus 1 is set in the tuning mode shown in FIG. 2. If the resonance frequency of the antenna 10 is judged to be higher than the reception frequency Fa (i.e., the RSSI voltage is judged to be higher than the reference voltage V0), the capacitance of the variable capacitor 23 is successively incremented (starting from the value C0) within a capacitance range that is higher than C0, until the RSSI voltage matches the reference value V0. If the resonance frequency of the antenna 10 is judged to be lower than the reception frequency Fa (the RSSI voltage is lower than V0), the capacitance of the variable capacitor 23 is successively decremented (starting from the value C0) within a capacitance range that is lower than C0, until the RSSI voltage becomes equal to V0.

Figure 7:
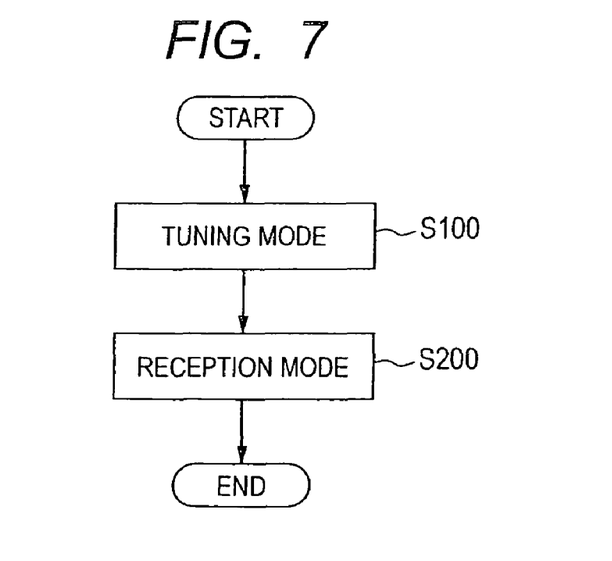
FIG. 7 is a flow diagram of control processing that is executed by a control circuit of the embodiment.

In step S200 of FIG. 7, following S100, the switches 50 and 51 are set in the reception mode shown in FIG. 1. In that condition, the microcomputer 90 performs various operation such as vehicle code discrimination, etc., based on the output signal from the receiving circuit 30.

With respect to the appended claims, in executing the processing of FIG. 8, the control circuit 70 corresponds to tuning circuit means as recited in the claims. In executing the processing of step S101 and step S102 or S012a of FIG. 8, the control circuit 70 corresponds to initial value determining means, while in executing steps S103 and S104, or steps S103a and S104a the control circuit 70 corresponds to capacitance adjustment means as recited in the claims. Switches 50 and 51, in combination, correspond to switch means as recited in the claims.

It will be understood that the invention enables tuning adjustment of the variable capacitor 23 to be more rapidly performed than is possible with prior art methods in which there is tuning ambiguity as described above, i.e., methods whereby it cannot be determined whether a variable capacitor is to be adjusted in a direction for increasing a resonance frequency or in a direction for decreasing that resonance frequency. With such a prior art method, it may be necessary to vary the capacitance of a variable capacitor] over its entire range of variation. With the above embodiment however, when a tuning operation is commenced, it can be immediately determined (e.g., based on a decision made in step S101 of FIG. 8) whether the capacitance of the variable capacitor 23 is to be varied within a range that is higher than a specific value (C0) or within a range which is lower than that specific value. Hence, the maximum amount by which the capacitance must be successively varied (i.e., the sweep width) can be substantially smaller than the entire range of variation of the variable capacitor 23.

In the examples of FIG. 9, for example, a sweep width of Wb is required for lowering the resonance frequency of the antenna 10 to match the reception frequency Fa (shown in FIG. 4), while a sweep width of We is required for raising the resonance frequency of the antenna 10 to match the reception frequency Fa.

When the wireless communication apparatus 1 operates in the reception mode of FIG. 1, the switch 51 disconnects the resistor 60 from the receiving circuit 30, so that the received signal from the antenna 10 is not attenuated by passing through the resistor 60. Furthermore since the matching circuit 20 does not utilize an inductor coupled to the antenna (as in the case of the antenna resonance circuit of reference document 1), the received signal from the antenna 10 is not attenuated by passing through such an inductor.

The wireless communication apparatus 1 of the above embodiment incorporates the local oscillator 36, for generating a local oscillator signal that is mixed with the reception signal in the filter circuit 32. Since that signal generated by the local oscillator 36 is utilized also for inducing resonance of the antenna 10 in the tuning mode, there is the advantage that it is unnecessary to provide an additional oscillator for use in the tuning mode. Hence there is no increase in circuit scale of the wireless communication apparatus 1 as a result of incorporating the automatic tuning function of the invention.

With this embodiment the input impedance of the receiving circuit 30 is assumed to be low, to such an extent that it would adversely affect resonance of the antenna 10 (in response to the oscillator signal in the tuning mode) if the antenna 10 were directly connected to the input of the receiving circuit 30 in the tuning mode, i.e., an excessive level of current would flow between the antenna 10 and the receiving circuit 30. By ensuring that the impedance of the resistor 60 (at the oscillator signal frequency) is sufficiently high, satisfactory resonance can be achieved, that is, the Q factor of the resonant circuit shown in FIG. 3 can be sufficiently high. Hence, changes in the RSSI voltage reliably indicate changes in the impedance of the antenna 10 (changes in the resonance frequency), in the tuning mode.

However if the input impedance of a receiving circuit such as the receiving circuit 30 is sufficiently high, then it might be possible to omit the resistor 60.

The tuning mode operation of the above embodiment is based on the fact that the frequency F0 of the local oscillator signal from the local oscillator 36, in the tuning mode, differs from the required reception frequency Fa. Specifically with the embodiment, the frequency F0 is higher than Fa. Hence in the tuning mode, the RSSI voltage (expressing the antenna current level Ia) from the A/D converter circuit 43 becomes higher than the reference value V0 when the resonance frequency of the antenna 10 is higher than the reception frequency Fa, while the RSSI voltage becomes lower than V0 when the resonance frequency of the antenna 10 is lower than Fa. It will be understood is that this would not occur if the frequency of the output signal from the local oscillator 36 were identical to the reception frequency Fa.

Furthermore with the above embodiment, as described referring to FIG. 8, when the tuning mode is entered and the resonance frequency of the antenna 10 is judged (based on the RSSI voltage and the reference value V0) to be higher than the reception frequency Fa, the capacitance of the variable capacitor 23 is thereafter successively increased starting from an initial value which is the reference value C0, within a range extending from C0 to the maximum value of the capacitance variation range, while successively judging whether the RSSI voltage has become equal to V0. Similarly, when the tuning mode is entered and the resonance frequency of the antenna 10 is judged to be lower than the reception frequency Fa, the capacitance of the variable capacitor 23 is thereafter successively decreased, starting from C0 as an initial value, within a range extending from C0 to a minimum value of the variation range of the variable capacitor 23, while successively judging whether the RSSI voltage has become equal to V0.

However as an alternative, it would be possible, when the tuning mode is entered and the resonance frequency of the antenna 10 is judged to be higher than the reception frequency Fa, to set the initial capacitance value as the maximum value of the capacitance variation range of the variable capacitor 23, and to thereafter successively decrease the capacitance of the variable capacitor 23 (within the range between the maximum capacitance value and the reference capacitance C0) until it is judged that the RSSI voltage has become equal to the reference voltage V0.

Similarly, when the tuning mode is entered and the resonance frequency of the antenna 10 is judged to be lower than the reception frequency Fa, the initial capacitance value could be set as the minimum value of the variation range of the variable capacitor 23, with the capacitance of the variable capacitor 23 being thereafter successively incremented (within the range between the minimum capacitance value and the reference capacitance C0) until the RSSI voltage coincides with the reference value V0.

Furthermore it will be understood that as a further alternative procedure, which falls within the scope claimed for the present invention, it would be possible to omit use of the reference capacitance C0. In that case, when the tuning mode is entered and the resonance frequency of the antenna 10 is judged to be higher than the reception frequency Fa, the initial capacitance value of the variable capacitor 23 would be set as the maximum value of the capacitance variation range, and the capacitance of the variable capacitor 23 would thereafter be successively decremented until it is judged that the RSSI voltage has become equal to the reference voltage V0. Similarly, when the tuning mode is entered and the resonance frequency of the antenna 10 is judged to be lower than Fa, the initial capacitance value of the variable capacitor 23 would be set as the minimum value of the variation range, and the capacitance of the variable capacitor 23 would thereafter be successively incremented until it is judged that the RSSI voltage has become equal to the reference voltage V0.

Furthermore with the above embodiment, with the wireless communication apparatus 1 installed in a vehicle, the tuning mode is entered each time the ignition switch of the vehicle is set on. However it would be equally possible to enter the tuning mode only at the time when the wireless communication apparatus 1 becomes installed in a vehicle, at a factory, before shipping the vehicle from the factory.

Furthermore the invention has been described for the case of a superheterodyne type of receiving circuit. However the invention would be applicable in general to a receiving circuit which includes an oscillation circuit that generates an oscillation signal at a frequency which differs by a fixed amount from a required reception signal frequency.

Figure 10:
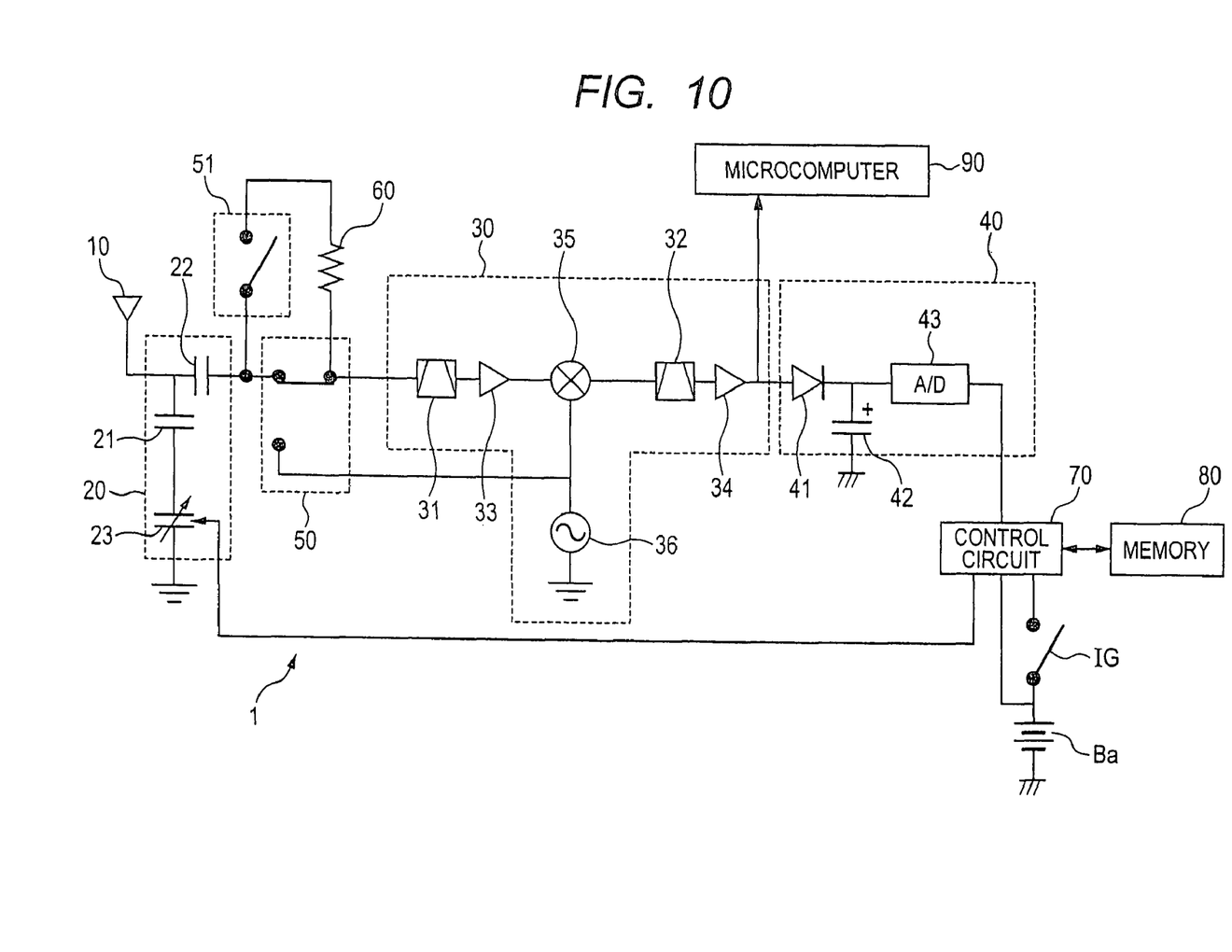
FIG. 10 is a diagram showing the overall circuit configuration of a modified form of the embodiment, set in a reception mode of operation.

Moreover the invention is not limited to the arrangement of the switch 51 shown in FIG. 1, which connects the resistor 60 between the antenna 10 and the input terminal of the receiving circuit 30 during operation in the tuning mode. A similar effect may be obtained by the alternative configuration of the above embodiment that is shown in FIG. 10, for the case of operation in the reception mode. With this alternative configuration, the switch 51 is controlled to connect the resistor 60 between the output terminal of the matching circuit 20 and the input terminal of the receiving circuit 30 in the tuning mode, and to disconnect the resistor 60 from the output terminal of the matching circuit 20 in the reception mode. The switch 50 is controlled to operate in the same manner as for FIGS. 1 and 2.

Furthermore as described above, it might be possible to omit the resistor 60 if the input impedance of the receiving circuit 30 is sufficiently high.

It is assumed that with the above embodiment, a reference capacitance value C0 is held stored in memory and utilized in the tuning mode. However it might be preferable to instead store and utilize a reference value of a control parameter such as a control voltage of a voltage-controlled capacitor, and to perform successive increments/decrements of that control parameter value, starting from that reference value as an initial value, in the tuning mode.

Moreover the invention is not limited in application to a wireless communication apparatus which is for installation in a vehicle, but would be equally applicable to wireless communication apparatuses for installation in ships, aircraft, railroad trains, etc., or wireless communication apparatuses for installation at a fixed location.

It can thus be understood that various modifications and alternative forms of the above embodiment may be envisaged, which fall within the scope claimed for the invention as set out in the appended claims.

What is claimed is:

1. A wireless communication apparatus comprising
a receiving circuit which receives a reception signal via an antenna,
a voltage detection circuit for detecting a level of signal power received by said receiving circuit,
a variable-impedance matching circuit controllable for effecting impedance matching between said antenna and said receiving circuit,
an oscillator circuit,
a current limiting resistor,
a first switch, controllable for connecting a selected one of said receiving circuit and said oscillator circuit to said matching circuit, a second switch, controllable for selectively connecting and disconnecting said current limiting resistor from between said antenna and said receiving circuit, said current limiting resistor serving to limit a level of current flowing between said antenna and said receiving circuit when connected between said antenna and said receiving circuit, a signal processing apparatus for processing an output received signal from said receiving circuit, when said first switch connects said receiving circuit to said matching circuit and said second switch disconnects said current limiting resistor from between said antenna and said receiving circuit, and a control circuit for controlling said connection and disconnection operations of said first switch and said second switch, and for controlling an impedance of said matching circuit to bring an output voltage value of said voltage detection circuit close to a predetermined reference voltage value, when said first switch connects said oscillator circuit to said matching circuit and said second switch connects said current limiting resistor between said antenna and said receiving circuit, with an output signal of said oscillator circuit thereby inducing resonance of said antenna.

2. A wireless communication apparatus comprising
an oscillator circuit,
a receiving circuit which receives a reception signal via an antenna and applies an output signal of said oscillator circuit to convert a frequency of said reception signal to a lower frequency,
  a voltage detection circuit for detecting a level of signal power received by said receiving circuit,
  a variable-impedance matching circuit controllable for effecting impedance matching between said antenna and said receiving circuit,
  a first switch, controllable for connecting a selected one of said receiving circuit and said oscillator circuit to said matching circuit,
  a second switch, controllable for selectively connecting said antenna to said receiving circuit and disconnecting said antenna from said receiving circuit,
  a signal processing apparatus for processing an output received signal from said receiving circuit, when said first switch connects said receiving circuit to said matching circuit and said second switch disconnects said antenna from said receiving circuit, and
  a control circuit for controlling said connection and disconnection operations of said first switch and said second switch, and for controlling an impedance of said matching circuit to bring an output voltage value of said voltage detection circuit close to a predetermined reference voltage value, when said first switch connects said oscillator circuit to said matching circuit and said second switch connects said antenna to said receiving circuit, with an output signal of said oscillator circuit thereby inducing resonance of said antenna.

3. A wireless communication apparatus comprising
a receiving circuit which receives a reception signal via an antenna,
a variable-impedance matching circuit controllable for effecting impedance matching between said antenna and said receiving circuit,
a voltage detection circuit for detecting a level of signal power received by said receiving circuit,
an oscillator circuit generating an oscillator signal having a frequency that differs from a frequency of said reception signal,
a current limiting resistor,
a first switch, controllable for connecting a selected one of said receiving circuit and said oscillator circuit to said matching circuit,
a second switch, controllable for selectively connecting said current limiting resistor between said antenna and said receiving circuit and disconnecting said current limiting resistor from between said antenna and said receiving circuit,
a signal processing apparatus for processing an output received signal from said receiving circuit, when said first switch connects said receiving circuit to said matching circuit and said second switch disconnects said antenna from said receiving circuit,
a control circuit for controlling said connection and disconnection operations of said first switch and said second switch, and for controlling an impedance of said matching circuit to bring an output voltage value of said voltage detection circuit close to a predetermined reference voltage value, when said first switch connects said oscillator circuit to said matching circuit and said second switch connects said current limiting resistor between said antenna and said receiving circuit, with an output signal of said oscillator circuit thereby inducing resonance of said antenna.

4. A wireless communication apparatus including
an antenna, and a receiving circuit which receives via said antenna a reception signal having a predetermined reception signal frequency,
a voltage detection circuit coupled to receive an output signal from said receiving circuit, for generating a detection voltage indicative of a value of signal power received by said receiving circuit,
a matching circuit connected to said antenna and to an input terminal of said receiving circuit, adjustable for establishing an impedance matched condition whereby an impedance of said antenna corresponds to an input impedance of said receiving circuit at said reception signal frequency and a resonance frequency of said antenna corresponds to said reception signal frequency,
an oscillator circuit generating an oscillator signal,
switch means coupled to each of said oscillator circuit, said receiving circuit and said matching circuit,
a control circuit for controlling said switch means to selectively establish a tuning mode in which said oscillator signal is applied to said matching circuit and said matching circuit is disconnected from said input terminal of said receiving circuit, and a reception mode in which said oscillator signal is isolated from said matching circuit and said matching circuit is connected to said input terminal of said receiving circuit, and for controlling said matching circuit during operation in said tuning mode to adjust a capacitance value of a variable capacitor of said matching circuit in accordance with said detection voltage;
wherein:
a frequency of said oscillator signal differs from said reception signal frequency by a fixed amount, and said apparatus comprises a memory having stored therein a reference voltage value, comprising a value of said detection voltage derived beforehand during operation in said tuning mode under said impedance matched condition; and
said control circuit comprises tuning circuit means functioning when said tuning mode is entered subsequent to deriving said reference voltage value, said tuning circuit means comprising:

initial value determining means configured for comparing said detection voltage with said reference voltage value and for determining an initial adjustment value of said capacitance value based on a result of said comparison, and capacitance adjustment means configured for successively adjusting said capacitance value while successively comparing said detection voltage with said reference voltage value, and for halting said successive adjustment when said detection voltage is judged to coincide with said reference voltage value, said successive adjustment commencing from said initial adjustment value.

5. A wireless communication apparatus according to claim 4, comprising a current limiting resistor having an impedance that is substantially higher than said input impedance of said receiving circuit, wherein said control circuit comprises means for controlling said switch means to connect said current limiting resistor between said antenna and said input terminal of said receiving circuit, with said matching circuit disconnected from said input terminal of the receiving circuit, during operation in said tuning mode, and controlling said switch means to connect an output terminal of said matching circuit to said input terminal of said receiving circuit, with said current limiting resistor disconnected from said antenna, during operation in said reception mode.

6. A wireless communication apparatus according to claim 4, comprising a current limiting resistor having an impedance that is substantially higher than said input impedance of said receiving circuit, wherein said control circuit comprises means for:

controlling said switch means to connect said current limiting resistor between an output terminal of said matching circuit and said input terminal of said receiving circuit, with said output terminal of said matching circuit disconnected from said input terminal of said receiving circuit, during operation in said tuning mode; and controlling said switch means to connect said output terminal of said matching circuit to said input terminal of said receiving circuit, with said current limiting resistor disconnected from said output terminal of said matching circuit, during operation in said reception mode.

7. A wireless communication apparatus according to claim 4, wherein said receiving circuit is a superheterodyne receiving circuit comprising a local oscillator circuit, and wherein said local oscillator circuit functions during operation in said tuning mode as said oscillator circuit which generates said oscillator signal.

8. A wireless communication apparatus according to claim 4, wherein said initial value determining means selects said initial adjustment value as one of a maximum capacitance value and a minimum capacitance value of a variation range of said variable capacitor.

9. A wireless communication apparatus according to claim 4, comprising a reference capacitance value held stored in said memory, said reference capacitance value comprising a capacitance value of said variable capacitor derived beforehand during operation in said tuning mode under said impedance matched condition.

10. A wireless communication apparatus according to claim 9, wherein said initial value determining means selects said initial adjustment value as a value within one of two capacitance variation ranges, said capacitance variation ranges respectively comprising a first range extending between said reference capacitance value and a maximum limit of capacitance variation and a second range extending between said reference capacitance value and a minimum limit of capacitance variation, said selected capacitance variation range being determined in accordance with said detection voltage value being higher than or lower than said reference voltage value.

11. A wireless communication apparatus according to claim 10, wherein said initial value determining means selects said initial adjustment value as one of a minimum value of said first range and a maximum value of said second range.

12. A wireless communication apparatus according to claim 10, wherein said initial value determining means selects said initial adjustment value as one of a maximum value of said first range and a minimum value of said second range.

13. A wireless communication apparatus according to claim 4, wherein said reference voltage value is derived in said tuning mode, under said impedance matched condition, while no metallic objects are located adjacent to said antenna.

14. A wireless communication apparatus according to claim 9, wherein said reference capacitance value and said reference voltage value are respectively derived in said tuning mode, under said impedance matched condition, while no metallic objects are located adjacent to said antenna.

* * * * *